United States Patent
Pyötsiä et al.

(10) Patent No.: US 9,037,281 B2
(45) Date of Patent: May 19, 2015

(54) METHOD AND APPARATUS FOR CONDITION MONITORING OF VALVE

(75) Inventors: Jouni Pyötsiä, Helsinki (FI); Harri Cederlöf, Lempäälä (FI); Mats Friman, Tampere (FI)

(73) Assignee: METSO FLOW CONTROL OY, Vantaa (FI)

( * ) Notice: Subject to any disclaimer, the term of this patent is extended or adjusted under 35 U.S.C. 154(b) by 888 days.

(21) Appl. No.: 13/143,136

(22) PCT Filed: Jan. 4, 2010

(86) PCT No.: PCT/FI2010/050001
§ 371 (c)(1),
(2), (4) Date: Aug. 1, 2011

(87) PCT Pub. No.: WO2010/079260
PCT Pub. Date: Jul. 15, 2010

(65) Prior Publication Data
US 2011/0295407 A1  Dec. 1, 2011

(30) Foreign Application Priority Data
Jan. 9, 2009  (FI) .................................. 20095012

(51) Int. Cl.
*G06F 17/00* (2006.01)
*F16K 37/00* (2006.01)

(52) U.S. Cl.
CPC ......... *F16K 37/0083* (2013.01); *F16K 37/0091* (2013.01)

(58) Field of Classification Search
CPC ............ F16K 37/0083; F16K 37/0091; G05B 19/41875; G05B 19/4184; G05B 23/0218–23/0235; G05B 23/024–23/0254; G06Q 10/06; H01L 22/20; G07C 3/146

USPC .............. 700/21, 79, 108–110, 174–177; 137/551–559; 702/179–185
See application file for complete search history.

(56) References Cited

U.S. PATENT DOCUMENTS 5,710,723 A * 1/1998 Hoth et al. .................... 702/181
5,758,686 A   6/1998 Ohtsuka et al.
(Continued)

FOREIGN PATENT DOCUMENTS

CN  2165303 Y  5/1994
CN  1710401 A  12/2005
(Continued)

OTHER PUBLICATIONS

Finnish Search Report issued in Finnish Patent Application No. 20095012 dated Nov. 11, 2009 (with translation).
(Continued)

*Primary Examiner* — M. N. Von Buhr
(74) *Attorney, Agent, or Firm* — Oliff PLC

(57) ABSTRACT

In the method and apparatus of the invention, the process point is taken into account when the condition and performance of a control valve are monitored. In the condition monitoring of the valve, process measurements are used in addition to measurements inside the valve in such a manner that the process measurements identify the operating point at which the valve operates, and the measurements inside the valve are observed at these operating points to detect changes and to determine the condition of the valve. According to an aspect of the invention, the variables representing the operating point of an industrial process are considered when changes in the friction load of the valve and/or the load factor of the actuator are observed.

20 Claims, 4 Drawing Sheets

(56) References Cited

U.S. PATENT DOCUMENTS

| | | | |
|---|---|---|---|
| 6,131,609 A | 10/2000 | Metso et al. | |
| 6,382,226 B1 | 5/2002 | Larson et al. | |
| 7,577,548 B1* | 8/2009 | Przytula et al. | 702/182 |
| 8,401,819 B2* | 3/2013 | Kavaklioglu | 702/179 |
| 2007/0078533 A1 | 4/2007 | Caldwell et al. | |
| 2008/0027678 A1 | 1/2008 | Miller | |
| 2008/0033693 A1* | 2/2008 | Andenna et al. | 702/179 |
| 2010/0106458 A1* | 4/2010 | Leu et al. | 702/181 |

FOREIGN PATENT DOCUMENTS

| | | |
|---|---|---|
| CN | 1736829 A | 2/2006 |
| CN | 201115807 Y | 9/2008 |
| CN | 101799365 A | 8/2010 |
| WO | WO 02/17028 A1 | 2/2002 |
| WO | WO 2006/031749 A2 | 3/2006 |

OTHER PUBLICATIONS

International Search Report issued in International Patent Application No. PCT/FI2010/050001 dated Apr. 19, 2010.

International Preliminary Report on Patentability issued in International Patent Application No. PCT/FI2010/050001 dated Apr. 20, 2011.

Friman, M., *A New Method for Condition Monitoring of Unit Processes and Field Devices* (in Finnish), In: Automation 2003 Seminar, Helsinki Fair Centre 9.—Sep. 11, 2003, Society of Automation, pp. 477-482.

Friman, M., *An Analysing and Monitoring Environment of Intelligent Control Valves* (in Finnish), In: Automation 2005 Seminar Helsinki Fair Centre 6.—Sep. 8, 2005.

Friman, M., *Managing Adaptive Process Monitoring: New Tools and Cases Examples*, Metso Automation, 16$^{th}$ Mediterranean Conference on Control and Automation, Jul. 27-29, 2007.

Samson., *Series 3730 and 3731, EXPERTplus Valve Diagnostics with Partial Stroke Test (PST).*, Datasheet [online]. Aug. 2008 Edition, Retrieved from the Internet on Mar. 29, 2010 from http://www.Samson.de/pdf_en/t83890en.pdf, pp. 4, 5, and 7.

Office Action issued in Chinese Application No. 201080006959.6 dated Oct. 10, 2012 (with translation).

* cited by examiner

METHOD AND APPARATUS FOR CONDITION MONITORING OF VALVE

BACKGROUND OF THE INVENTION

The invention relates to condition monitoring of valves in industrial processes.

Condition monitoring of process equipment, such as valves, plays a significant role in undisturbed operation and performance of processes. Faulty valves can lead to unplanned shutdowns of factories and cause significant costs. As a result, different types of condition monitoring systems have been developed for observing the condition of valves, which are based on measurements on the operation of a valve packet performed by intelligent positioners. Intelligent digital valve controllers have brought along a great number of valve performance indicators. They enable a better productivity in maintenance and life cycle management of valves. Since one maintenance organisation may be responsible for numerous, even as many as 5000, valves, it is obvious that an automatic analysis and performance monitoring helps to understand the overall picture, anticipate the need for maintenance and allocate the maintenance operations.

There are various types of condition monitoring methods, and they are often divided, according to the level of knowledge, into model-based and statistical methods. Many condition monitoring applications exist, and they may be divided into general and device-specific applications, for example. A device-specific condition monitoring application is most suitable when a device is critical for the operation and safety of a production plant. Another reason for selecting a device-specific application is the number of installed devices; for instance, there are often so many valves that the best solution is to use a valve-specific condition monitoring application.

Friman M., A New Method for Condition Monitoring of Unit Processes and Field Devices (in Finnish), In: Automation 2003 Seminar, Helsinki Fair Centre 9, —11 Sep. 2003, Society of Automation, Helsinki, 2003, p. 477-482, discloses a statistical condition monitoring method, which has been applied to condition monitoring of pumps. The method employs conditional histograms, which is a common statistical analyzing method, and, if necessary, the operation method and operating point of the process, for instance, are taken into account in the monitoring. The property to be monitored is called a quality variable. The quality variable may be any variable indicating something about the operation of the device, such as electric current of a pump, the measured quality, cost, or a performance variable calculated on the basis of the measurements. Operating point variables are explanatory variables acting on a quality variable. Operating point variables may include, for instance, flow, pressure after the pump, production volume and production rate, type and product number, raw material property, process state, such as idle, start-up and shutdown, or other malfunction or failure, and process stage. The method distinguishes between operating point variables and quality variables. A quality distribution, i.e. a histogram, is generated from a quality variable in a short time range (for instance, the distribution of electric current of a pump in the last 4 hours), whereby the values of the quality variable are divided into a plurality of bins (for example, the electric current of the pump is divided into eleven bins 40, 41, . . . 50A). In addition, operating point specific reference distributions are generated, each of which represents the quality distribution in a group of operating points in a long time period. The operating points are formed by dividing the operating point variables into a plurality of bins (for example, six bins, such as 15, 19, . . . 35 l/s, for flow, and three bins, such as 200, 300, 400 kPa, for pressure after the pump). The operator is shown a momentary quality distribution (such as the electric current distribution of the pump in the last 4 hours) and a reference distribution, to which the operator may compare the momentary distribution. Thus, the pump that functions more poorly than before is immediately revealed at one glance on the basis of the quality and reference distributions differing from one another.

Mats Friman et al., An Analysing and Monitoring Environment of Intelligent Control Valves (in Finnish), In: Automation 2005 Seminar, Helsinki Fair Centre 6. —8 Sep. 2005, discloses a condition monitoring method, wherein the present operation and state of a control valve are compared with a valve-specific model (multi-variable histogram) generated form the history data of the device. Signals describing the present operation and state of the valve may be measurements, such as a deviation and a load factor, or counters, such as valve travel meter and number of reversals. As a result of the comparison, a fuzzy cluster is provided for each signal with classes 'high', 'normal' and 'low'. These readings indicate at which level the last observations are compared to a longer-time distribution of the same signal. Fuzzy clusters are supplied to a reasoning mechanism, to which known valve failures are configured, as a high/normal/low combination of different signals. As a result of the reasoning, the condition of the valve and the matching with known faults are estimated. For each valve, one performance-related identification, i.e. a performance index (PI), is calculated, which may also be observed as a trend. The index varies between 0 and 1, whereby the bigger index means a better performance. PI=1 means that the valve is ok, PI=0 means the worst possible performance situation. The trend of the performance index is observed in order to anticipate the occurrence of faults.

Mats Friman et al., Managing Adaptive Process Monitoring: New Tools and Case Examples, Conference: The 15th Mediterranean Conference on Control and Automation (MED'07), Athens, Greece, 2007, discloses a similar condition monitoring based on conditional histograms.

SUMMARY OF THE INVENTION

It is an object of the invention to provide an improved method and apparatus for condition monitoring of a valve in the processing industry. In this description, a valve refers to any combination of a shut-off valve or control valve, an actuator operating the valve and a valve controller controlling the actuator. The object of the invention is achieved by a method and an apparatus, which are characterized by what is disclosed in the independent claims. The preferred embodiments of the invention are disclosed in the dependent claims.

In the method of the invention, the process state is taken into account when the condition and performance of the valve are monitored. According to an embodiment of the invention, in addition to measurements inside the valve, process measurements are used in the condition monitoring of the valve in such a manner that the process measurements identify the operating point at which the valve operates, and the measurements inside the valve are observed at these operating points to detect changes and to determine the condition of the valve. When the operation of the valve is only compared with the reference measurements at the same operating point, a much more accurate final result is achieved in observation of the changes, because this makes it possible to notice "unlinearities" complicating the condition monitoring of the valve and to eliminate the effect thereof on the condition monitoring.

One of the challenges in fault diagnostics of valves is to recognize friction problems of the actuator and the valve sufficiently reliably among the faults in the positioner. A problem is that faults of a positioner, such as contamination of the slide, cause similar consequences to the dynamics of the valve packet as friction or blocking problems of the actuator or the valve. On one hand, it is a demanding task to distinguish between the friction problem of a valve and the friction problem of an actuator in sufficiently good time, but it plays an important role in the maintenance of the valve. In an embodiment, the method takes into account the pressure difference over the valve as well as the changes in the opening angle. Thus, the condition monitoring of a valve becomes considerably more accurate, because, among other things, the change in the pressure difference essentially acting on the valve load (friction, dynamic torque) can be taken into account.

According to an embodiment of the invention, the method for monitoring the condition of a valve comprises the steps of:

collecting performance variable data representing an operation of a valve operating in an industrial process, generating a statistical reference distribution representing a long-term behaviour of a given performance variable of the valve on the basis of said collected performance variable data, generating a statistical distribution representing a short-term behaviour of said performance variable of the valve, generating a statistical reference distribution representing a long-term behaviour of said performance variable of the valve, analysing the present condition of the valve by comparing the short-term statistical distribution with the long-term statistical reference distribution, collecting operating point variable data representing an operating point of the industrial process, generating said statistical distribution representing the short-term behaviour of a given performance variable of the valve separately at a plurality of operating points of the industrial process, generating said statistical reference distribution representing the long-term behaviour of a given performance variable of the valve separately at a plurality of operating points of the industrial process, in said analysis, analysing the present condition of the valve by comparing the short-term statistical distribution at different operating points with the long-term reference distributions of the corresponding operating points.

According to an embodiment of the invention, said variable representing the operating state of the industrial process comprises at least one of the following variables: a pressure difference over the valve, a control to the valve, a valve position, an instrument air pressure, a pressure before the valve or another variable measured from the industrial process and proportional to the pressure difference over the valve.

According to an embodiment of the invention, said variables representing the operating state of an industrial process are considered when changes in the friction load of the valve and/or the load factor of the actuator are observed.

According to an embodiment of the invention, said given performance variable of the valve is one of the following: equilibrium deviation, standard deviation of equilibrium deviation, dynamic state deviation, friction, equilibrium friction, starting load, slide valve position, standard deviation of slide valve position, number of reversals, ratio of reversals to momentum.

An embodiment of the invention comprises:

obtaining, as a result of the analysis, information on the changes of the performance variable at different operating points, calculating one common normalised performance indicator from the obtained information, comparing the value of the performance indicator with a threshold, interpreting the operation of the valve as abnormal when the value of the performance index reaches said threshold.

According to an embodiment of the invention, the friction problem of a valve or an actuator can be localized as a result of the analysis by comparing the changing of the load factor of the actuator and that of the valve relative to one another.

BRIEF DESCRIPTION OF THE DRAWINGS

The invention will be explained in greater detail in the following in connection with exemplary embodiments and with reference to the attached drawings, in which.

DETAILED DESCRIPTION OF EXAMPLE EMBODIMENTS

The method according to the example embodiments of the invention takes into account the process state when the condition and performance of the valve are monitored. According to an embodiment of the invention, in addition to measurements inside the valve, process measurements are used in the condition monitoring of the valve in such a manner that the process measurements identify the operating point at which the valve operates, and the measurements inside the valve are observed at these operating points to detect changes and to determine the condition of the valve. When the operation of the valve is only compared with reference measurements carried out at the same operating point, a much more accurate final result is achieved in observation of the changes, because this enables to notice "unlinearities" complicating the condition monitoring of the valve and to eliminate their effect on the condition monitoring.

Figure 1:
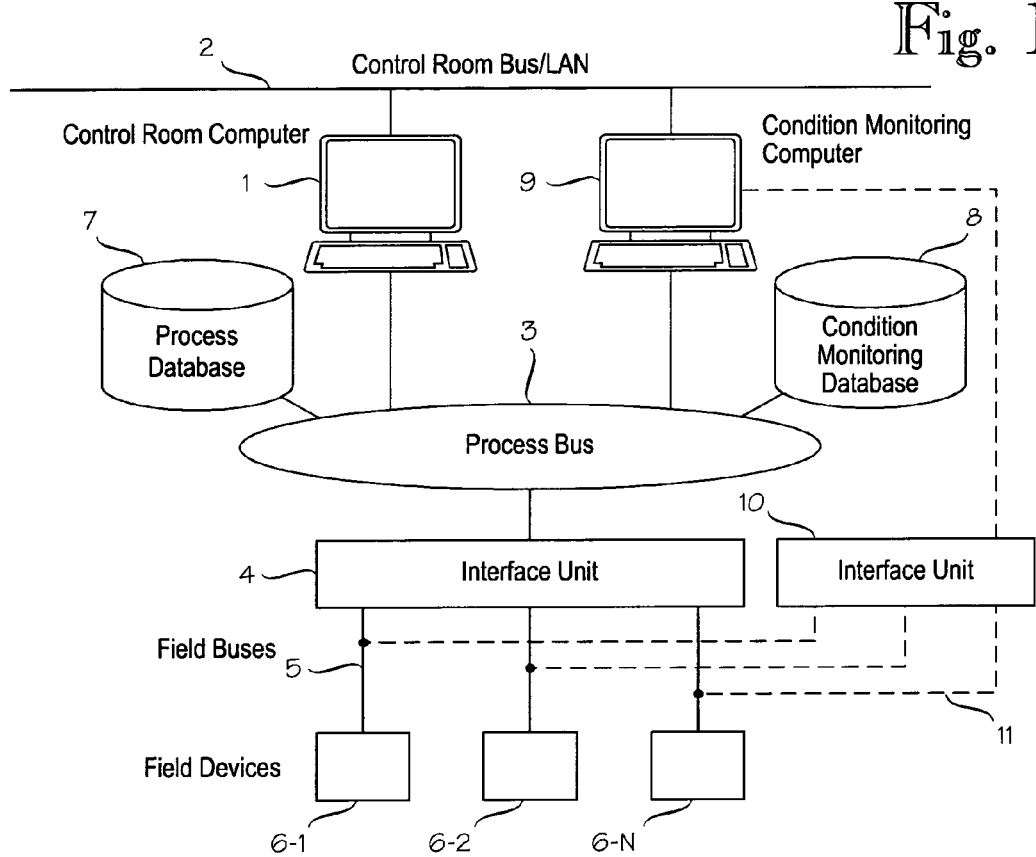
FIG. 1 shows an exemplary decentralized automation system.

The invention may be applied to the condition monitoring of valves in any process or automation system. An automation system may be an individual programmable logic device or a system for controlling the operation of the entire factory, for example. FIG. 1 schematically illustrates an exemplary decentralized automation system, to which the example embodiments of the invention may be applied. The central processing unit of the automation system controlling the productive activity of an entire factory, such as a paper mill, is typically a control room, which is composed of one or more control room computers 1, for example. The automation system may comprise a process bus/network 3 and/or a control room bus/network 2, by which different process control components or computers are coupled to one another. The control room bus/network 2 may interconnect the user interface components of the automation system. The control room bus/network 2 may be a local area network, for example, based on the standard Ethernet technology. The process bus/network 3 may, in turn, interconnect the process control components. The process bus/network 3 may be based on a deterministic token passing protocol, for instance. Process controllers may also be connected to the control room network 3, allowing the communication between the process controllers and the user interfaces. The process network 3 may also be connected with one or more interface units or I/O (input/output) units, to which control buses 5, generally referred to as field buses, are connected. Field buses connect individual field devices 6-1, 6-2, . . . 6-N, such as actuators, valves, pumps and sensors, in the field to the control room computers 1. Examples of field bus types include Foundation Fieldbus, Profibus and HART. One example of such a decentralized automation system is MetsoDNA (DNA, Dynamic Network of Applications) delivered by Metso Automation Inc. It must be appreciated, however, that FIG. 1 only illustrates one example of an automation system and it is not the intention to limit the application area of the invention to any specific implementation of an automation system.

A field device may be, for example, a control valve provided with an intelligent valve controller. The operation of an intelligent valve controller may be based on a microcontroller, such as a microprocessor (μP), which controls the position of the valve on the basis of control information obtained from the field bus. The valve controller is preferably provided with valve position measurement, in addition to which it is possible to measure many other variables, such as supply pressure ($p_s$) for pressurized air, pressure difference ($\Delta p_{actuator}$) over actuator piston or temperature, which may be necessary in the self-diagnostics of the valve or which the valve controller transmits as such or as processed diagnostic information to the control room computer, process controller, condition monitoring computer or a similar higher-level unit of the automation system via a field bus. An example of such an intelligent valve controller is Neles ND9000 manufactured by Metso Automation Inc.

The automation system according to the example embodiment of FIG. 1 is also connected with a condition monitoring computer 9 monitoring the condition of field devices. The condition monitoring computer 9 may be a part of the automation system, in which case it preferably communicates with the field devices via the process bus and the field buses. Although the condition monitoring computer 9 is shown as a separate device in FIG. 1, it may also be a part of the control room computer or software of the automation system or of some other station or software of the automation system. The condition monitoring computer 9 may also be separate from the automation system, in which case it may be connected to the field buses via its own interface unit 10 (such as a HART multiplexer for HART field devices or an ISA or PCI card or an ISA or PCI gateway for PROFIBUS field devices), the I/O port/ports 11 of which is/are connected (broken lines 11 represent interface buses) to the field bus/buses 5 and the other side of which is connected via a suitable data bus to the condition monitoring computer 9. The condition monitoring computer 9 collects diagnostics information and status information provided by the field devices and warns the user of potential problems before they harm the process. Each field device provides the information on its status itself and the condition monitoring computer reads this information from the field device via a field bus. An example of this type of monitoring computer or software is FieldCare™ software delivered by Metso Automation Inc.

Diagnostics and measurement information obtained from the field devices may be stored in suitable databases, such as a process database 7 and a condition monitoring database 8. The process database 7 may, for instance, store process measurements on the valve environment performed by the automation system, such as pressure difference over valve ($\Delta p_{valve}$) and control to valve ($i_{val}$) or valve position ($h_{val}$). If the pressure difference over the valve is not known, the pressure of the inlet pipes is in most cases sufficient for determining the process state. The condition monitoring database 8 may store, for instance, measurements and diagnostics information the changes of which are observed in order to find out the condition of the valve, such as load factor (LF), deviation ($\Delta E$), counters ratio (CR) of reversals to momentum of the valve. The load factor LF describes the required torque with respect to available torque. For example, the load factor value 62% means that 62% of the maximum torque of the actuator are needed for opening the valve. A high load factor indicates a high friction or an undersized actuator. In other words, the load factor of 100% indicates that the actual load may exceed the available torque. In an embodiment of the invention, the load factor LF of the actuator is determined as a variable $\Delta p_{actuator}/p_s$, i.e. by dividing the propelling pressure difference of the combination of actuator and valve (pressure difference $\Delta p_{actuator}$ over actuator piston) by the supply pressure $p_s$. A deviation means a difference or error between the setpoint value and the actual position of the valve. Other examples of feasible performance variables include equilibrium deviation, standard deviation of equilibrium deviation, dynamic state deviation, friction, equilibrium friction, starting load, position of a positioner or a slide valve of a valve controller, standard deviation of slide valve position, number of reversals, ratio of reversals to momentum.

Figure 2A:
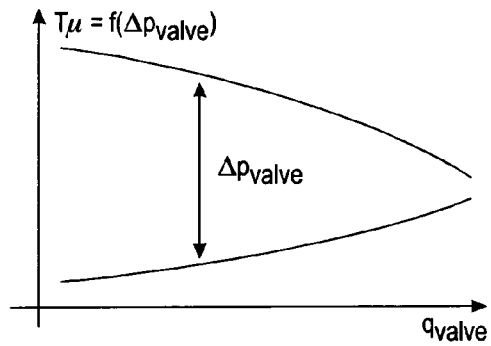
FIGS. 2A and 2B illustrate a non-linear operation of the valve for a dynamic torque $M_{dyn}$ and a friction load $M_{valve}$, respectively.
Figure 2B:
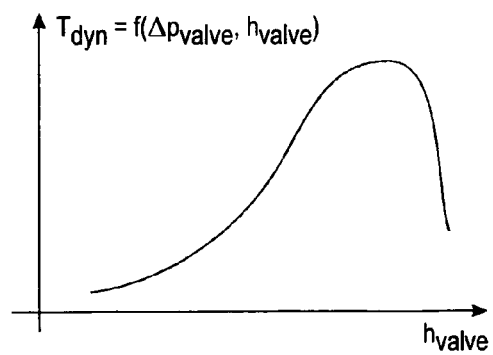

According to some embodiments of the invention, said variables representing the operating state of an industrial process are taken into account when changes in the friction load of the valve and/or the load factor of the actuator are monitored. In some example embodiments of the invention, the condition monitoring considers the changes in the pressure difference $\Delta p_{valve}$ over the valve and in the valve opening angle $h_{valve}$. Thus, the condition monitoring of the valve becomes considerably more accurate, because, among other things, the change in the pressure difference essentially acting on the valve load (friction, dynamic torque) can be considered. The non-linear operation of the valve is illustrated for dynamic torque $M_{dyn}$ in FIG. 2A and for friction load $M_{valve}$ in FIG. 2B.

Figure 3:
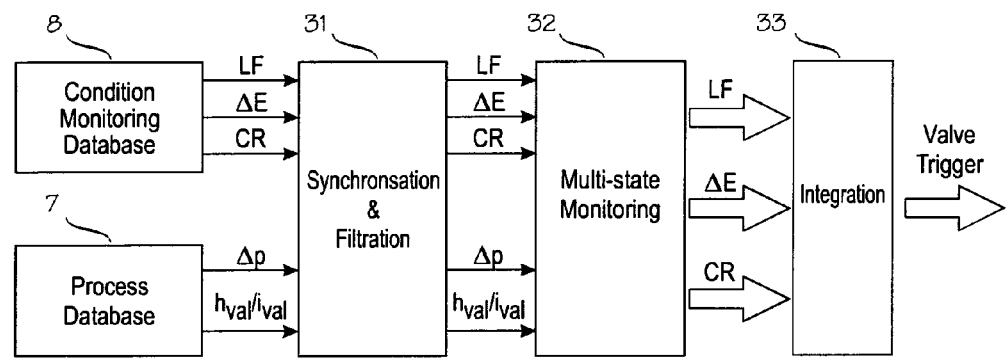
FIG. 3 shows a functional block diagram of a condition monitoring arrangement according to an example embodiment of the invention.
Figure 4:
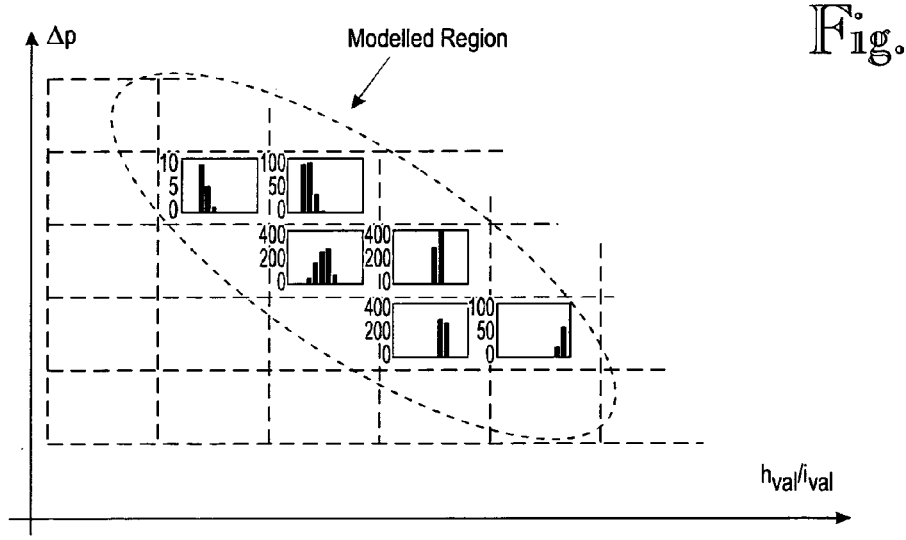
FIG. 4 illustrates histograms of the valve load factor at different operating points ($\Delta p$, $i_{val}/h_{val}$)

FIG. 3 shows an operational block diagram of a condition monitoring arrangement according to an example embodiment of the invention. Measurements and diagnostics information, the changes of which are observed to detect the condition of the valve, are read from the database 8 of the valve condition monitoring system, for example. Measurements used in the example include a load factor (LF), deviation ($\Delta E$) and/or counters ratio (CR) of reversals to valve momentum, without, however, restricting the invention thereto. Process measurements on the environment of the valve performed by the automation system, for example, may be used for determining the operating point. These process measurement data are obtained from the process database, for example. In the example, these process measurement data include pressure difference over valve (Δp), control/supply pressure to valve ($i_{val}$) or valve position ($h_{val}$), without, however, restricting the invention thereto. If the pressure difference over the valve is not known, the pressure of the inlet pipes, for instance, or some other pressure measurement may be used for determining the process state. A synchronizing and filtering block 31 first filters off irrelevant elements from the measurements and synchronizes different measurement data temporally with each other. An analysing block 32 uses these filtered measurement data for multi-state monitoring (MUST) and analysing, whereby the process state can be taken into account when the condition and performance of the devices are monitored. In multi-state monitoring, new valve measurements at different operating points are compared with the history collected at the corresponding operating points. This may be carried out by generating for the valve measurement (e.g. LF) to be monitored at each process point a distribution based on short-term measurements, i.e. a short-term histogram, in which the values of the variable to be monitored are divided into a plurality of bins (for instance, the load factor is divided into ten value bins). In addition, operating point specific reference distributions are generated, each of which represents a distribution based on long-term measurements of the variable to be observed, i.e. a long-term histogram. The operating points are formed by dividing the operating point variables into a plurality of bins (for instance, 5 bins for pressure difference $\Delta p_{valve}$, and 6 bins for valve opening angle $h_{valve}$). This is illustrated schematically in FIG. 4, which shows a group of histograms at different operating points (Δp, $i_{val}$/$h_{val}$). Referring now to FIG. 3, as the output of the analysing block 32, information. on the changes of the valve measurements (e.g. LF, ΔE, CR) at different operating points is obtained. These changes are integrated into one variable, performance index or "valve trigger" for each valve, indicating changes in the valve operation. It is also possible to set an alarm limit for this variable, and when the limit is reached, an alarm report, alarm signal or alarm message is generated, transmitted and/or displayed for a maintenance person or the like.

Figure 8:
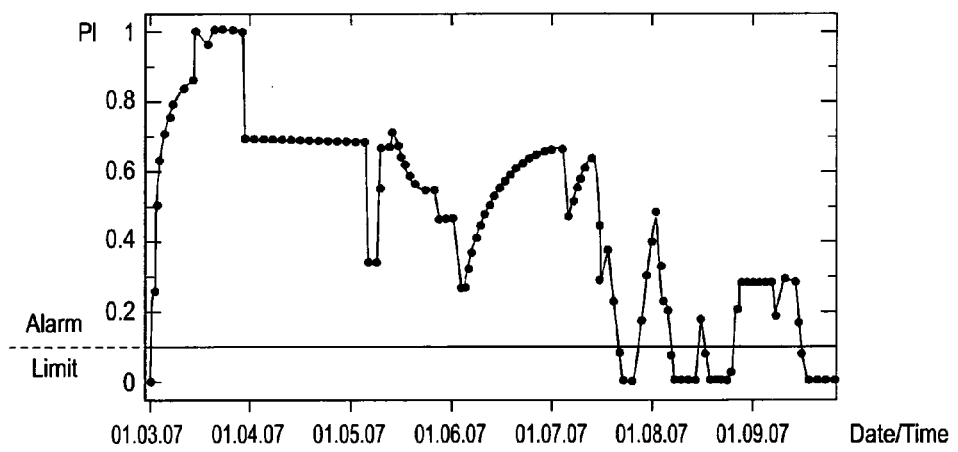
FIG. 8 is a graph showing an example of the changing of the performance index as a function of time.

In some embodiments of the invention, one performance-related identification, i.e. a performance index (PI), which may also be observed as a trend, is calculated for each valve. The index varies between 0 and 1, whereby the bigger index means a better performance. PI=1 means that the valve is ok, PI=0 means the worst performance situation. For instance, the performance index may describe what is the proportion of "good" or "bad" measuring values in the measurements. The trend of the performance index is observed in order to anticipate the occurrence of faults. FIG. 8 is a graph showing an example of how the performance index changes as a function of time. The alarm limit is set to a value of 0.1, whereby a lower value causes an alarm.

Figure 5:
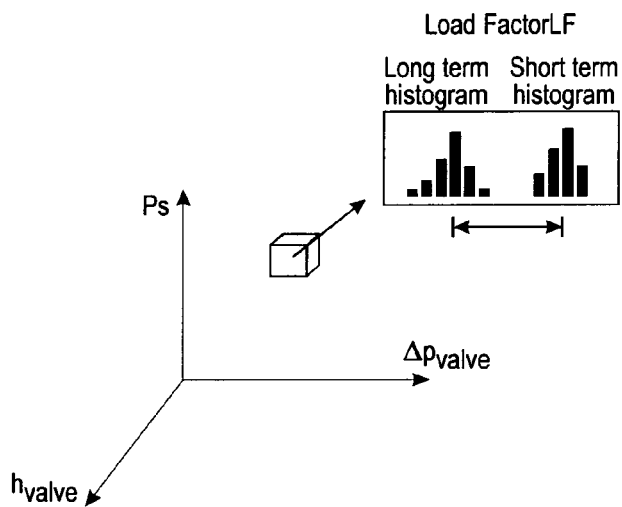
FIG. 5 illustrates histograms of the valve load factor at different operating points ($\Delta p_{valve}$, $h_{valve}$, $P_s$)

In an embodiment of the invention, an operating point is determined for observing the load factor of the valve-actuator by using the supply pressure ($p_s$) of instrument air of the positioner or the valve controller, the pressure difference over the valve ($\Delta p_{valve}$) and the valve opening angle ($h_{valve}$). By taking into account these factors, it is possible to compensate for unlinearities having a natural effect on the load factor of the combination of valve and actuator, measured from the actuator. When the load factor LF is compared in sort of small state elements (in three-dimensional space ($p_s$, $\Delta p_{valve}$, $h_{valve}$)), in which the supply pressure of the positioner, the valve opening and the pressure difference over the valve are constant, it is possible to accurately detect the changes in the load factor in connection with friction or blocking problems of the actuator or the valve. This is illustrated in FIG. 5, where a long-term statistical distribution of the load factor is compared with a short-term statistical distribution of the load factor. The deviations indicate a friction or blocking problem of the combination of actuator and valve in a given operating state, i.e. state element ($p_s$, $\Delta p_{valve}$, $h_{valve}$) of the control valve.

(An) alarm limit(s) may be set for the deviation, and when this limit is reached, an alarm report, alarm signal or alarm message is generated, transmitted and/or displayed for a maintenance person or the like. The histograms for one or more operating points, as shown in FIG. 5, may be displayed for a maintenance person or the like in real time, when necessary, or after said alarm limit has been reached, for instance.

Figure 6:
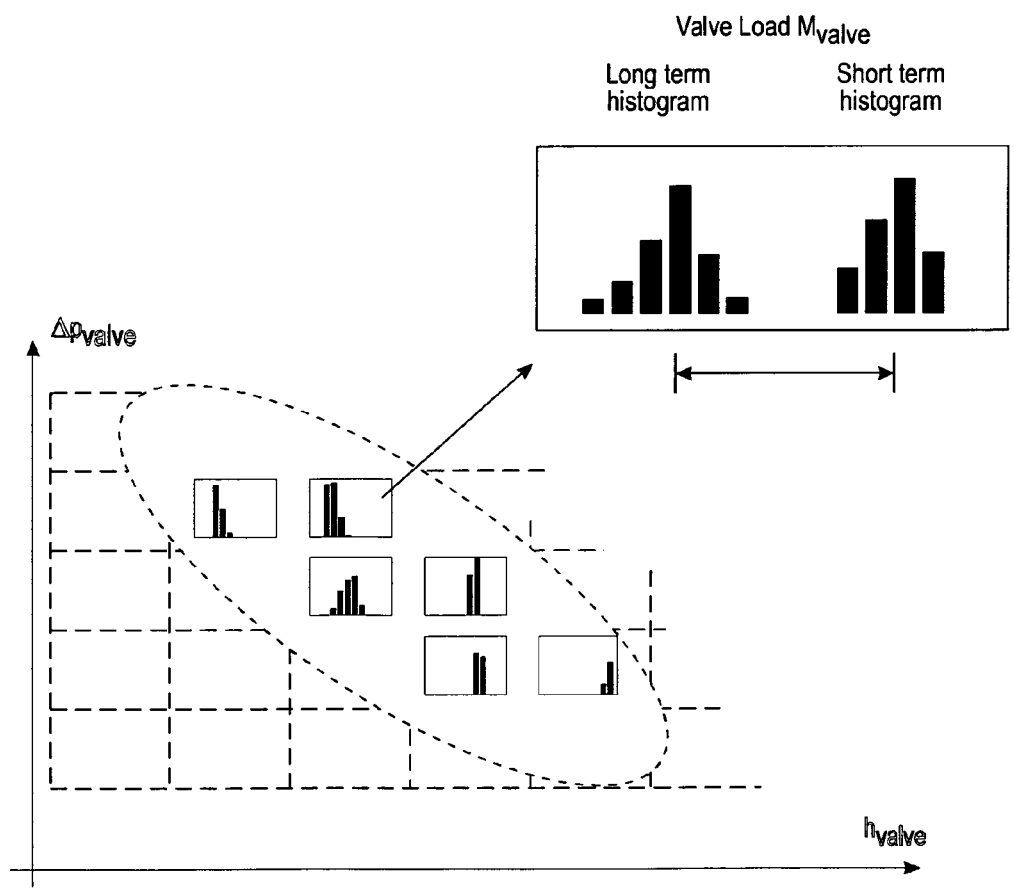
FIG. 6 illustrates histograms of valve load at different operating points ($\Delta p_{valve}$, $h_{valve}$)

In an example embodiment of the invention, the fault (a friction or blocking problem) of the combination of valve and actuator may after detection be localized in the valve or the actuator by utilizing the MUST method again. In this embodiment, the changing of the total torque ($M_{valve}$) due to the valve load is observed or monitored. The magnitude of the valve load is made up of (depending on the valve type) of seal friction, box friction, supporting bearing friction, thrust bearing friction and/or dynamic torque of the valve. In these cases, the pressure difference over the valve ($\Delta p_{valve}$) is an important factor along with the opening angle ($h_{valve}$) (dynamic torque). FIG. 6 is an illustrating view of the monitoring of the valve load ($M_{valve}$) at a given operating point or state ($\Delta p_{valve}$, $h_{valve}$) and the comparison of the long-term load (long-term histogram) and the momentary load (short-term histogram). The deviation between the long-term and momentary loads indicates an increasing friction or blocking problem of the valve. Important factors to be considered (explanatory factors) include the pressure difference over the valve and the valve opening angle.

In an embodiment of the invention, the pressure difference over the valve ($\Delta p_{valve}$) is not measured or used, but the only factor to be considered (explanatory factor) is the valve opening angle $h_{valve}$. This corresponds to a situation where only the histograms in the lowermost row are examined in FIG. 6.

A friction or blocking problem of the valve or the actuator may be localized, for example, in the following manner:

a) An increase in the load factor LF of the combination of valve and actuator indicates a friction or blocking problem in the valve or the actuator.

b) An increase in the valve load ($M_{valve}$) simultaneously with an increase in the load factor LF of the combination of valve and actuator indicates a friction or blocking problem in the valve.

c) The valve load ($M_{valve}$) remains constant but the load factor LF of the combination of valve and actuator increases, which indicates a friction or blocking problem of the actuator (such as a friction or blocking problem of the lever mechanism).

d) In cases where a friction or blocking problem of both the valve and the actuator develops at the same time, the problem is detected by observing the ratio of the load factor LF of the combination of actuator and valve to the valve load ($M_{valve}$) at a given operating point by means of the MUST method. If the ratio remains approximately constant, it indicates that the friction increases both on the actuator side and the valve side. In this case, the explanatory factors are the same as in FIG. 4.

Figure 7:
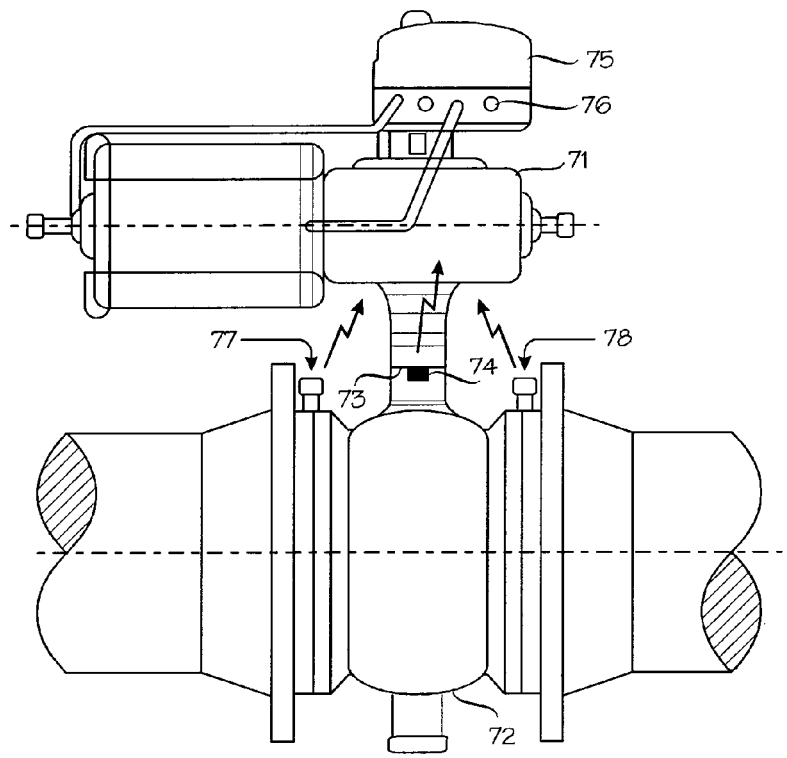
FIG. 7 illustrates the positioning of sensors to the control valve to determine the total torque caused by the valve load and the pressure difference over the valve.

According to an embodiment of the invention, the total torque ($M_{valve}$) is determined by utilizing a strain gauge 74 or strain gauges, which is/are placed onto the valve shaft 73 at the connecting point between the actuator 71 and the valve housing 72 in a manner shown in FIG. 7, for example. Due to moment, the shaft 73 is turned and the strain gauge attached thereto stretches, and by measuring the change in the resistance of the strain gauge it is possible to measure the strain of the shaft 73 and the moment. The accurate value of the valve moment need not be determined but it is sufficient to measure the resistance change, because the MUST method allows indirect measurements. To reduce temperature changes and effects of non-desired forces, a strain gauge or strain gauges connected to a Wheatstone bridge may be used. A Wheatstone bridge is composed of four resistors mounted in a pattern of a square standing on its corner. Supply pressure is fed from upper and lower corners, and input voltage is measured at the remaining corners. If the input voltage is zero, the bridge is in balance and not subjected to any external forces (the valve shaft does not become twisted or tensioned when the actuator opens or closes the valve). One or more of the bridge resistors may be a strain gauge. In strain gauge transducers there is preferably a strain gauge in place of each resistor. If any of the strain gauges is subjected to an external force (for example, when the valve shaft has twisted as a result of an increased moment), the bridge is imbalanced. Since there are four strain gauges, the force is naturally applied to all four gauges. The force causes a resistance change in the gauges, which may be measured and then converted into a desired unit, such as a voltage signal. These measurement data may be supplied in a wired or wireless manner to a valve controller 75, for instance, from where it is transmitted via a field bus to a condition monitoring computer, for instance. FIG. 7 illustrates a wireless connection, whereby the valve controller 75 comprises a wireless receiver 76.

The pressure difference over the valve ($\Delta p_{valve}$) may be measured by, for instance, pressure sensors 77 and 78 on both sides of the valve, as illustrated in FIG. 7. The pressure sensors 77 and 78 may be connected to the valve controller 75 in a wired or wireless manner. FIG. 7 illustrates a wireless connection, whereby the valve controller 75 comprises a wireless receiver 76. If the pressure difference of the valve ($\Delta p_{valve}$) is not known (measured), the valve opening ($h_{valve}$) may in several applications also be used for describing the pressure difference over the valve (a clear correlation between the valve opening and the volume flow). The process state may also be determined by means of the pressure of the inlet pipes, for instance, or some other pressure measurement.

In an embodiment of the invention, the pressure difference over the valve ($\Delta p_{valve}$) is determined based on the difference of the load factors LF measured in the open and closed directions. The difference of the load factors describes the magnitude of the dynamic torque of the valve, which, in turn, is proportional to the pressure difference over the valve.

The above description of the example embodiments is only intended to illustrate the invention. The invention may have different variations and embodiments within the scope of the attached claims.

The invention claimed is:

1. A method for condition monitoring of a valve, the method comprising:
    collecting performance variable data representing an operation of a valve operating in an industrial process,
    collecting operating point variable data representing an operating point of the industrial process,
    generating, on the basis of said collected performance variable data and said collected operating point variable data, a statistical distribution representing a short-term behaviour of a given performance variable of the valve separately at a plurality of operating points of the industrial process,
    generating, on the basis of said collected performance variable data and said collected operating point variable data, a statistical reference distribution representing a long-term behaviour of a given performance variable of the valve separately at a plurality of operating points of the industrial process,
    analysing the present performance of the valve by comparing the short-term statistical distribution at different operating points with the long-term reference distributions of the corresponding operating points.

2. A method as claimed in claim 1, wherein the variable representing said operating point of the industrial process comprises at least one of the following variables: a pressure difference over the valve, a control to the valve, a valve position, an instrument air pressure, a pressure before the valve or another variable measured from the industrial process and proportional to the pressure difference over the valve.

3. A method as claimed in claim 1, comprising
    obtaining, as a result of the analysis, information on the changes of the performance variable at different operating points,
    calculating one common normalised performance indicator from the obtained information,
    comparing the value of the performance indicator with a threshold,
    interpreting the operation of the valve as abnormal when the value of the performance indicator reaches said threshold.

4. A method as claimed in claim 1, comprising
    localizing, as a result of the analysis, a friction problem of the valve or an actuator by comparing the changing of a load factor of the actuator and a load factor of the valve relative to one another.

5. A method as claimed in claim 1, comprising determining a pressure difference over the valve based on a difference of load factors of an actuator or load factors of the valve measured in the open and closed directions.

6. A method as claimed in claim 1, comprising
    observing a load factor of the valve and a load factor of an actuator separately at a plurality of operating points, which are determined by using a supply pressure of instrument air of a positioner, a pressure difference over the valve and a valve opening angle.

7. A method as claimed in claim 6, comprising
    comparing a long-term statistical distribution of a load and/or loading factor with a short-term statistical distribution of a load and/or loading factor at said operating points,
    detecting a friction or blocking problem of the actuator or the valve at a given operating point when there is a deviation between the short-term statistical distribution of the load and/or loading factor and the long-term statistical distribution of the load and/or loading factor at the given operating point.

8. A method as claimed in claim 6, comprising
    detecting a friction or blocking problem in the valve at a given operating point when the load factor of the actuator and a valve load increase simultaneously.

9. A method as claimed in claim 6, comprising
    detecting a friction or blocking problem in the actuator at a given operating point when the load factor of the actuator increases but a valve load remains constant.

10. A method as claimed in claim 6, comprising
    detecting the increase of friction in both the valve and the actuator at a given operating point when the load factor of the actuator increases and its ratio to a valve load remains substantially constant.

11. A method as claimed in claim 1, comprising determining a valve load by measuring torsional strain of a shaft between an actuator and the valve.

12. An apparatus, comprising
means for collecting performance variable data representing an operation of a valve operating in an industrial process,
means for collecting operating point variable data representing an operating point of the industrial process,
means for generating, on the basis of said collected performance variable data and said collected operating point variable data, a statistical distribution representing a short-term behaviour of a given performance variable of the valve separately at a plurality of operating points of the industrial process,
means for generating, on the basis of said collected performance variable data and said collected operating point variable data, a statistical reference distribution representing a long-term behaviour of a given performance variable of the valve separately at a plurality of operating points of the industrial process, and
means for analysing the present performance of the valve by comparing the short-term statistical distribution at different operating points with the long-term reference distributions of the corresponding operating points.

13. A computer device, wherein the computer device is communicatively connected to at least one field device controlling a valve in an industrial process, the computer device comprising a software code which, when run in the computer device, cause the computer device to provide routines
collecting performance variable data representing an operation of a valve operating in an industrial process,
collecting operating point variable data representing an operating point of the industrial process,
generating, on the basis of said collected performance variable data and said collected operating point variable data, a statistical distribution representing a short-term behaviour of a given performance variable of the valve separately at a plurality of operating points of the industrial process,
generating, on the basis of said collected performance variable data and said collected operating point variable data, a statistical reference distribution representing a long-term behaviour of a given performance variable of the valve separately at a plurality of operating points of the industrial process,
analysing the present performance of the valve by comparing the short-term statistical distribution at different operating points with the long-term reference distributions of the corresponding operating points.

14. A computer device as claimed in claim 13, wherein the variable representing said operating state of the industrial process comprises at least one of the following variables: a pressure difference over the valve, a control to the valve, a valve position, an instrument air pressure, a pressure before the valve or another variable measured from the industrial process and proportional to the pressure difference over the valve.

15. A computer device as claimed in claim 13, wherein said given performance variable of the valve is one of the following: equilibrium deviation, standard deviation of equilibrium deviation, dynamic state deviation, friction, equilibrium friction, starting load, slide valve position, standard deviation of slide valve position, number of reversals, ratio of reversals to momentum.

16. A computer device as claimed in claim 13, comprising further routines of
obtaining, as a result of the analysis, information on the changes of the performance variable at different operating points,
calculating one common normalised performance indicator from the obtained information,
comparing the value of the performance indicator with a threshold,
interpreting the operation of the valve as abnormal when the value of the performance indicator reaches said threshold.

17. A computer device as claimed in claim 13, comprising a further routine of localizing, as a result of the analysis, a friction problem of the valve or an actuator by comparing the changing of a load factor of the actuator and a load factor of the valve relative to one another.

18. A method for condition monitoring of a valve, the method comprising:
collecting performance variable data representing an operation of a valve operating in an industrial process,
collecting operating point variable data representing an operating point of the industrial process,
generating, on the basis of said collected performance variable data and said collected operating point variable data, a statistical distribution representing a short-term behaviour of at least one performance variable of the valve separately at a plurality of operating points of the industrial process,
generating, on the basis of said collected performance variable data and said collected operating point variable data, a statistical reference distribution representing a long-term behaviour of at least one performance variable of the valve separately at a plurality of operating points of the industrial process, and
analysing the present performance and predicting a future performance of the valve by comparing the short-term statistical distribution at different operating points with the long-term reference distributions of the corresponding operating points.

19. A method for condition monitoring of a valve, the method comprising:
collecting performance variable data representing an operation of a valve operating in an industrial process,
collecting operating point variable data representing an operating point of the industrial process,
generating, on the basis of said collected performance variable data and said collected operating point variable data, a statistical distribution representing a short-term behaviour of at least one performance variable of the valve separately at a plurality of operating points of the industrial process, said given at least one performance variable of the valve further comprises one or more of the following: starting load, slide valve position, standard deviation of slide valve position, number of reversals, ratio of reversals to momentum,
generating, on the basis of said collected performance variable data and said collected operating point variable data, a statistical reference distribution representing a long-term behaviour of at least one performance variable of the valve separately at a plurality of operating points of the industrial process, and
analysing the present condition of the valve by comparing the short-term statistical distribution at different operating points with the long-term reference distributions of the corresponding operating points.

20. A method for condition monitoring of a valve, the method comprising:
- collecting performance variable data representing an operation of a valve operating in an industrial process,
- collecting operating point variable data representing an operating point of the industrial process,
- generating, on the basis of said collected performance variable data and said collected operating point variable data, a statistical distribution representing a short-term behaviour of a given performance variable of the valve separately at a plurality of operating points of the industrial process,
- generating, on the basis of said collected performance variable data and said collected operating point variable data, a statistical reference distribution representing a long-term behaviour of a given performance variable of the valve separately at a plurality of operating points of the industrial process,
- predicting a fault of the valve by comparing the short-term statistical distribution at different operating points with the long-term reference distributions of the corresponding operating points.

* * * * *